Figure 1:
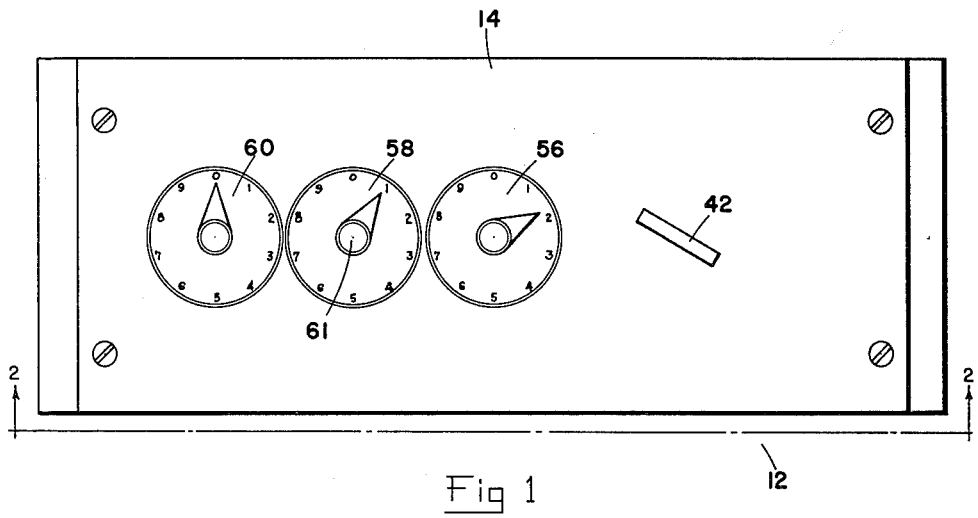

Jan. 16, 1962   T. L. GREENWOOD   3,017,083
SHOCK REGISTER

Filed Aug. 15, 1958   2 Sheets-Sheet 1

THOMAS L. GREENWOOD
INVENTOR.
BY

Jan. 16, 1962 T. L. GREENWOOD 3,017,083
SHOCK REGISTER
Filed Aug. 15, 1958 2 Sheets-Sheet 2

THOMAS L. GREENWOOD
INVENTOR.

BY S.J. Rotondi
A.J. Dupont
Victor L. Billings
William P. Murphy

3,017,083
SHOCK REGISTER
Thomas L. Greenwood, 1709 La Grande St., Huntsville, Ala.
Filed Aug. 15, 1958, Ser. No. 755,364
4 Claims. (Cl. 235—91)
(Granted under Title 35, U.S. Code (1952), sec. 266)

The invention described herein may be manufactured and used by or for the Government for governmental purposes without the payment of any royalty thereon.

My invention relates to registers for recording mechanical shocks above a predetermined intensity, and more particularly to such registers for recording the number of such shocks applied thereto.

Many of the mechanisms in modern engineering applications are so delicate as to be able to withstand only a limited number of shocks above a critical intensity and still retain their reliability. The number of shocks a particular mechanism can withstand above a predetermined intensity of shock is accurately obtained by destructive testing of the mechanism and is called the shock life thereof. The shock life of certain mechanisms may be of great importance in applications to systems of great complexity such as missiles, when the mechanisms have been subjected to the rigors of transportation and the successful use of the systems depends upon the reliability of delicate mechanisms.

An object of my invention therefore is to provide a register for attachment to a mechanism to record the number of shocks applied thereon above a predetermined intensity of shock.

Another object of my invention is to provide such a register for recording the total number of the shocks applied to a mechanism.

An additional object of my invention is to provide such a register having an inertia device to register the shocks above a predetermined critical intensity applied to a mechanism.

A further object of my invention is to provide such a register with an escapement device for operation responsive to operation of the inertia device.

A still further object of my invention is to provide such a register with a device for recording the total number of operations of the inertia device.

Other aims and objects of my invention will appear from the following description thereof.

In carrying out my invention a shock register is provided with a body disposed for attachment to a mechanism whose shock life is to be determined, and an inertia device including a member disposed in the body to slide reciprocably in the direction of application of shocks. A resilient device biases the member to a neutral position and the mass of the member and the constants of the device are disposed for slidable operation of the member in strokes responsive to values of the shocks in excess of a predetermined intensity.

The register includes an escapement disposed for operation responsive to the strokes of the register and a counting device geared to the escapement to record the number of operations thereof.

Figure 2:
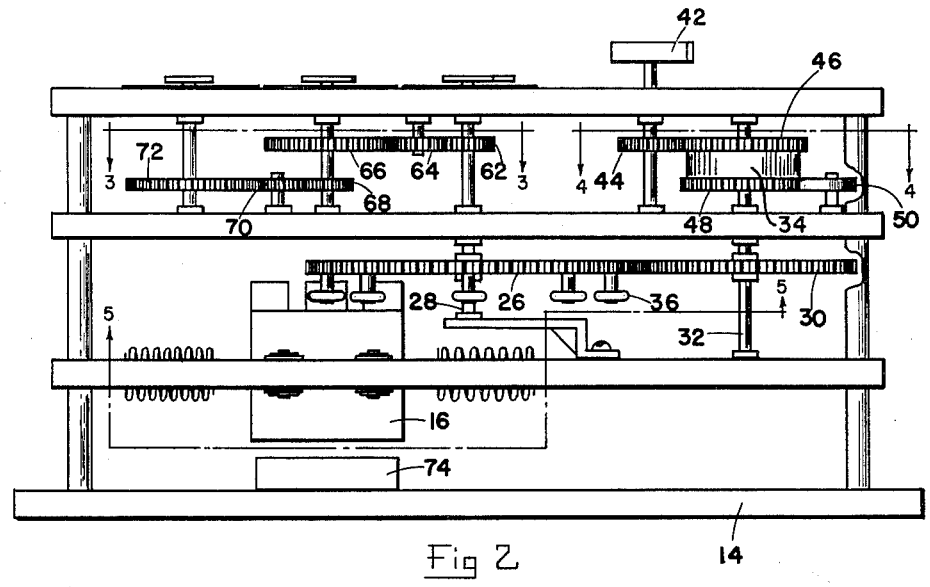
Figure 3:
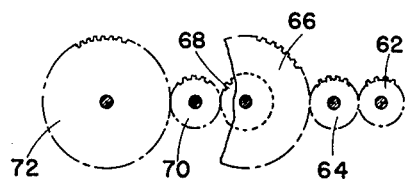
Figure 4:
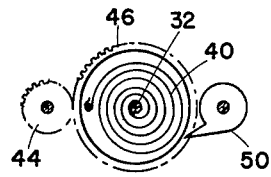
Figure 5:
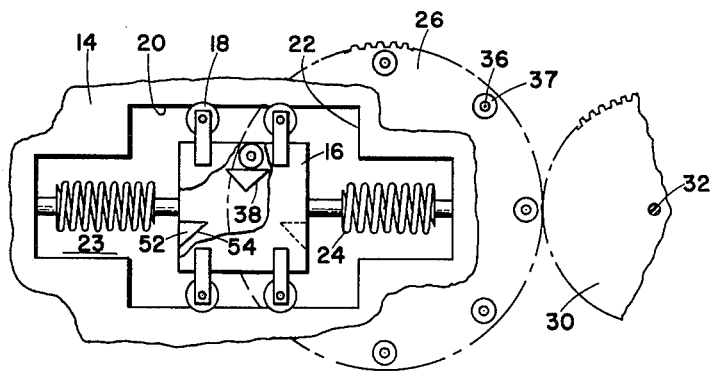
Figure 6:
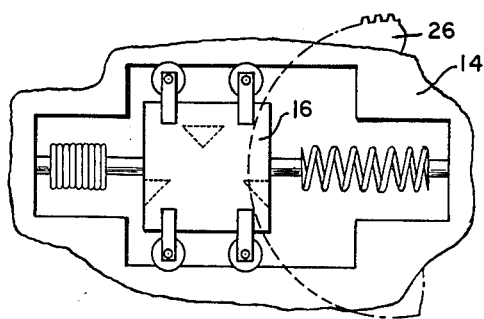

For more complete understanding of my invention, reference is directed to the following description and the accompanying drawing, in which, FIG. 1 is a top view of a shock register incorporating my invention;
FIG. 2 is a view along line 2—2 of FIG. 1;
FIG. 3 is a view along line 3—3 of FIG. 2;
FIG. 4 is a view along line 4—4 of FIG. 2; and
FIG. 5 is a view along line 5—5 of FIG. 2.
FIG. 6 is a view similar to FIG. 5 with member 16 displaced from the neutral position.

Accordingly, a shock register 12 is provided with a frame 14 disposed for attachment to a mechanism, for investigation of the shock life thereof. Frame 14 includes a slot 22 and a member 16 is provided with rollers 18 in engagement with rails 20 for reciprocal operation in slot 22. A resilient device 23 includes a pair of springs 24 to bias member 16 to a neutral position in slot 22 as shown in FIG. 5.

An escapement wheel 26 disposed on a shaft 28 includes peripheral teeth for engagement with a gear 30 disposed on a shaft 32. Shafts 28 and 32 are journaled in normal relation to frame 14. A drum 34 is rotatably disposed on shaft 32.

Wheel 26 includes pins 36 with rollers 37 journaled thereon and the rollers are spaced for successive engagement with a stop 38 secured to member 16. A spring 40 is secured to drum 34 and shaft 28 for wound relation therebetween to bias rollers 37 towards stop 38. A key 42 is secured to a gear 44 disposed to engage a gear 46 on a rim of drum 34 for rotation thereof to wind spring 40. The opposite rim of drum 34 includes a ratchet wheel 48 for engagement with a pawl 50 disposed on frame 14 and spring-biased for rotation of drum 34 in the winding direction only. Member 16 is provided with a pair of stops 52, flanking stop 38.

Member 16 operates in slidable strokes responsive to shocks above the predetermined intensity to disengage stop 38 from a particular roller, and wheel 36 is rotated responsive to spring 40 for selective engagement of stops 52 with the particular roller. As member 16 is returned to the neutral position responsive to resilient device 23, the particular roller is disengaged from stop 52 and stop 38 engages the succeeding roller. Surfaces 54 of stops 38 and 52 are sloped for clearance of rollers 37 therefrom. Dials 56, 58 and 60, secured to frame 14 are provided with indicators 61 disposed for rotation responsive to rotation of shaft 28, by means of gears 62, 64, 66, 68, 70 and 72, respectively to indicate units, tens, and hundreds of the shocks.

Member 16 is disposed with an electrically conductive material and a small permanent magnet 74 is mounted on frame 14 adjacent the neutral position to dampen the motion of member 16 by induction of eddy currents therein.

While the foregoing is a description of the preferred embodiment, the following claims are intended to include those modifications and variations that are within the spirit and scope of my invention.

I claim:

1. A shock register comprising a frame disposed for attachment to a mechanism and provided with a slot; an inertia device disposed therein and provided with a member slidably secured in said slot and a pair of springs secured between said frame and said member for bias thereof to a neutral position and operation thereof in slidable strokes responsive to shocks above a predetermined value applied to the mechanism; and a device secured to said frame for recording the number of the shocks responsive to the strokes.

2. A register as in claim 1 disposed with said member including a single stop and a pair of stops spaced therefrom and disposed in flanked relation therewith; said recording device including an escapement wheel provided with angularly spaced rollers and journaled in said support for neutral position selective engagement of said rollers with said single stop and slidable stroke selective engagement of said rollers with said pair of stops; and said recording device including means for biasing said rollers into the engagements with said stops.

3. A register as in claim 2 with said escapement wheel provided with peripheral teeth; and said biasing means including a shaft journaled in said frame; a gear secured to said shaft for engagement with said teeth; a drum rotatably disposed on said shaft; a spring secured between said drum and said shaft; and a key and ratchet means disposed for winding said spring around said shaft to bias said rollers toward said stops.

4. A register as in claim 3 with a set of dials geared to said escapement wheel and graduated to indicate units, tens, and hundreds of the shocks.

References Cited in the file of this patent

UNITED STATES PATENTS

| | | |
|---|---|---|
| 1,150,756 | Gocke | Aug. 17, 1915 |
| 1,343,875 | Reese | June 15, 1920 |
| 1,696,087 | Harris | Dec. 18, 1928 |
| 1,975,183 | Supper | Oct. 2, 1934 |
| 2,207,204 | Peyton et al. | July 9, 1940 |
| 2,244,417 | Bacon | June 3, 1941 |
| 2,578,803 | Holmberg et al. | Dec. 18, 1951 |
| 2,867,382 | Weaver | Jan. 6, 1959 |

FOREIGN PATENTS

| | | |
|---|---|---|
| 704,450 | France | May 20, 1931 |
| 798,647 | France | Mar. 10, 1936 |
| 644,615 | Germany | May 8, 1937 |